Jan. 16, 1968 W. HILBERG 3,364,475

TIME DELAY COMPENSATION FOR COINCIDENT CURRENT
MATRIX SELECTION CIRCUITS

Filed Sept. 7, 1965 minimum time: t=T maximum time: t=2 (n-1) τ+T

INVENTOR
Wolfgang Hilberg

BY Spencer & Kaye

ATTORNEYS

United States Patent Office 3,364,475
Patented Jan. 16, 1968

3,364,475

TIME DELAY COMPENSATION FOR COINCIDENT CURRENT MATRIX SELECTION CIRCUITS

Wolfgang Hilberg, Neu-Ulm (Danube), Germany, assignor to Telefunken Patentverwertungsgesellschaft m.b.H., Ulm (Danube), Germany Filed Sept. 7, 1965, Ser. No. 485,362
Claims priority, application Germany, Sept. 24, 1964, T 27,071
4 Claims. (Cl. 340—173)

The present invention relates to a computer storage unit wherein the individual storage elements are arranged in a matrix form. The matrix arrangement is the most common arrangement of storage units for electronic computer systems and in most cases comprises several individual matrices which are all respectively in one plane and are combined so that they lie on top of one another or one behind the other and in this manner form the storage block.

When selecting the counting and computing result, respectively, contained in such a storage unit, the so-called coincidence method is the most sophisticated method, since it requires the least technical expenditure. Therefore, this method is the one used in connection with most ferrite ring core storage units. The operating principle of this method is that those storage elements are always interrogated at which two switching pulses are present simultaneously, i.e., for interrogation purposes, the row wire and the column wire of the selected storage elements must have current flowing therethrough simultaneously.

A difficulty in employing this interrogation method results from the fact that the switching times of the present storage elements are becoming increasingly shorter due to the storage elements comprising, in addition to ferrite ring cores, for example, thin, magnetic laminae, tunnel diodes, and cryotron circuits. Thus, a storage element may be switched, as in the case of tunnel diode matrices in fractions of a nanosecond, and when using cryotrons, the switching times are also in the order of magnitude of a nanosecond.

With such a short switching time, however, the propagation velocity of electrical signals in the switching lines, which velocity although being very high is still a finite value, is a factor to be considered. This velocity leads to a limitation of the speed of the coincidence operation due to the fact that the coincidence signals do not arrive at the same time at the intersecting point of rows and columns where the selected storage element is located. Another factor which limits the use of the coincidence method is that, in most cases, the propagation velocity of electrical waves in air, which is approximately 30 cm. per nanosecond, cannot be the guiding velocity value. The effective velocity is rather a smaller value since, as a consequence of the position of the coincidence lines in the immediate vicinity of a dielectric or magnetic material, the distributed capacity $C'$ and the distributed inductivity $L'$ are factors incorporated in the propagation velocity and thus diminish its magnitude. These considerations are also present in magnetic storage elements which, although they operate presently at a smaller switching speed than, for example, the tunnel diodes, can also contribute substantial amounts to the distributed inductivity $L'$ due to the fact that the storage elements positioned in the same row or column which are not being interrogated have in most cases a substantial permeability.

An additional factor is the recovery periods necessitated by the decaying phenomena of inductors and capacitors, which also causes a decrease in the admissible selection frequency, so that the pulse recurrence frequency of the known computer storage means is still further decreased.

It is therefore an object of the present invention to provide a computer storage means having rapidly operating storage elements in which the coincidence method during interrogation is usable for all desired combinations of storage elements. It is a further object of the present invention to provide a computer storage means having an increased pulse recurrence frequency when using the coincidence method.

In accordance with the invention, there is provided a computer storage means having the storage elements arranged in a matrix with a delay line being provided in front of each row and each column wire of the matrix. The delay of the delay line is increased from column to column and from row to row, starting from a common corner of the matrix, by that time period required for a switching pulse to traverse the distance between two adjacent points of intersection in the matrix.

Additional objects and advantages of the present invention will become apparent upon consideration of the following description when taken in conjunction with the accompanying drawings in which.

Figure 1:
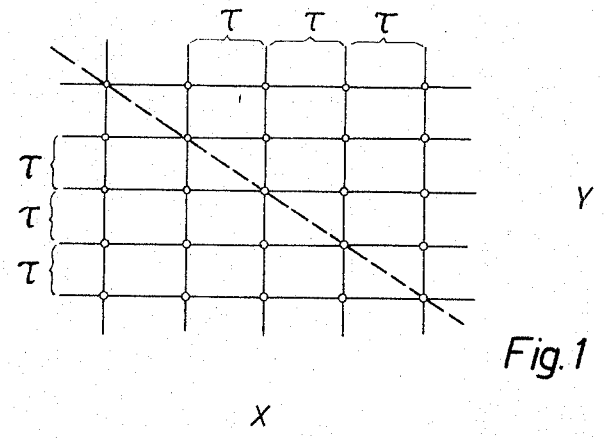
FIGURE 1 is a schematic view of a computer storage unit arranged in a matrix.

Referring now to the drawing, there is shown in FIGURE 1 a computer storage means having column and row wires $x$ and $y$, respectively, with each storage element being shown as a dot at the point of intersection of the row and the column wires for the sake of clarity. The period required for a signal to traverse the distance between two intersecting points is set forth by the symbol $\tau$. Thus, when very short switching pulses are simultaneously applied in the coincidence method to the desired row and column wires of storage units having rapidly switching storage elements the result is that only those storage elements positioned in an arrangement illustrated in FIGURE 1 by the diagonal, dashed line are influenced.

Accordingly, when the value $\tau$ for the transit time of the signal between two intersecting points is considered, the result is obtained for a matrix having $n$ rows and the same number of columns, that very short selection pulses miss each other, in all storage elements not positioned on a diagonal, by at least the period $\tau$, and at most by the time $(n-1)\tau$.

Figure 2:
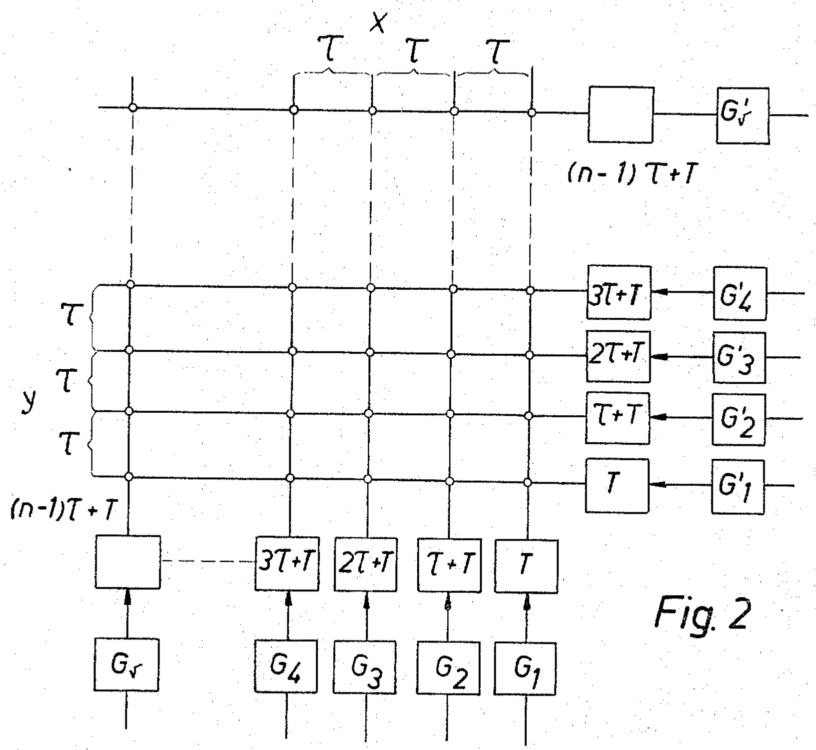
FIGURE 2 is a schematic view of a computer storage means arranged in a matrix according to the present invention.

In FIGURE 2, a schematic view of a computer storage means according to the invention is illustrated. In this figure, a selection generator $G_r$ is connected in front of each selection wire, i.e., in front of each column and row wire $x$ and $y$, respectively, for providing pulses to the wires. The control of these selection generators can, of course, also be conducted via a selection matrix.

Following the respective selection generator $G_r$ or $G_r'$, there is connected respectively one delay line. The delay of the individual lines increases by respectively the amount $\tau$, starting from a common corner of the matrix, this point being in FIGURE 2 at the right-hand lower corner of the matrix, from row to row, or column to column. The value $T$ being common to all delay lines represents an equally large common delay and at the same time indicates the minimum period which must pass after the selection pulse has been applied and before a coincidence can be obtained. Starting with this value, the delay times in the individual delay lines increase by respectively the value $\tau$, so that the delay time of the column and row wires having the greatest distance from the common edge amounts to $(n-1)\tau+T$. The maximum time period until a coincidence sets in then amounts to $t=2(n-1)\tau+T$.

Accordingly, a particularly advantageous fact in the computer storage means of the invention is that the selection pulses can be put into the matrix in a very close succession, i.e. the minimum spacing is controlled solely by the length of the pulses and is of the order of, for example, $t=\tau$. The computer storage means of the invention thus makes possible a substantial increase of the selection frequency in comparison to the previously known computer storage means, wherein a local coincidence of the selection pulses can only be obtained by making the selection pulses very long. The corresponding minimum value for the length of the pulses in the known storage units is of the order of $t=(n-1)\cdot\tau$.

It will be understood that the above description of the present invention is susceptible to various modifications, changes, and adaptations, and the same are intended to be comprehended within the meaning and range of equivalents of the appended claims.

What is claimed is:

1. A computer storage having a matrix-like arrangement of storage elements, wherein each of the storage elements has a row wire and a column wire connected thereto to form a point of intersection comprising, in combination, a plurality of delay lines, one of said delay lines being connected to one end of each row wire and each column wire of the matrix, said delay lines having a delay period which increases from column to column and from row to row, respectively, starting at a common corner of the matrix, by the amount of time required for a switching pulse to traverse the distance between two adjacent points of intersection in the matrix.

2. A computer storage means for use with the coincidence method of interrogation comprising, in combination:

a plurality of storage elements;

a plurality of row wires;

a plurality of column wires, one of said column wires and one of said row wires being connected to each of the storage elements to form an intersecting point and together forming a matrix-like arrangement of storage elements;

a plurality of delay lines, one of said delay lines being connected to one end of each row wire and each column wire of the matrix, said delay lines having a delay period which increases from column to column and from row to row, respectively, starting at a common corner of the matrix, by the amount of time required for a switching pulse to traverse the distance between two adjacent points of intersection in the matrix.

3. A computer storage means as defined in claim 2, wherein said delay lines are provided with a common delay period in addition to the increasing delay period, said common delay period being the minimum time which must pass between the application of a pulse at a row wire and a column wire and the arrival of the pulses at a point of intersection.

4. In combination with the computer storage means as defined in claim 3, a plurality of selection generators, one of which is connected to each delay line for providing pulses to the respective delay line.

References Cited

UNITED STATES PATENTS

| | | | |
|---|---|---|---|
| 3,111,580 | 11/1963 | Keefer | 340—166 |
| 3,117,309 | 1/1964 | Wolf | 340—166 |
| 3,236,951 | 2/1966 | Yamamoto et al. | 333—29 |

BERNARD KONICK, *Primary Examiner.*

J. F. BREIMAYER, *Assistant Examiner.*